United States Patent [19]

Kirk

[11] 3,963,307
[45] June 15, 1976

[54] SAFETY REFLECTOR DEVICE

[76] Inventor: Norbert A. Kirk, 43 E. Ohio St., Chicago, Ill. 60611

[22] Filed: June 10, 1974

[21] Appl. No.: 478,099

[52] U.S. Cl. .................................... 350/99; 40/39; 40/125 H; 116/28 R
[51] Int. Cl.² ........................ G02B 5/12; B60R 1/00
[58] Field of Search ............... 116/28 R, 46; 350/98, 350/99, 97; 301/37 SA; 40/39, 125 H; 280/289

[56] References Cited
UNITED STATES PATENTS

| | | | |
|---|---|---|---|
| 1,138,285 | 5/1915 | Green | 40/37.1 X |
| 1,555,102 | 9/1925 | Chatfield | 40/39 X |
| 2,642,777 | 6/1953 | Bradler | 350/99 |
| 2,759,396 | 8/1956 | Clune | 350/99 |
| 3,636,912 | 1/1972 | Kamp | 116/28 R |
| 3,757,730 | 9/1973 | Douglas | 116/28 R |
| 3,758,190 | 9/1973 | Douglas | 350/99 X |

*Primary Examiner*—Richard C. Queisser
*Assistant Examiner*—Daniel M. Yasich
*Attorney, Agent, or Firm*—Larson, Taylor and Hinds

[57] ABSTRACT

A safety signal device for bicycles and the like includes a shield member which is mounted on an elongate support member and provides a flag type safety warning, visible over hills or the like, of an approaching vehicle. A rotatable reflector, visible from behind the vehicle, is mounted rearwardly of the air shield in such a position that a portion thereof is shielded from the air flowing relative to the device and another portion is in the air flow to cause rotation of the reflector.

13 Claims, 6 Drawing Figures

SAFETY REFLECTOR DEVICE

BACKGROUND OF THE INVENTION

This invention relates to safety warning devices for vehicles. More particularly, it relates to such devices for bicycles. In one aspect it relates to "flag" warning devices, visible over hills and the like, used to warn of an approaching vehicle. In another aspect, it relates to reflector warning devices used for night riding safety.

While many safety warning devices are known, there exists a need for improved devices, particularly for such devices that are simple and lightweight in construction and reliable and yet inexpensive and rugged. It is an object of the present invention to provide a safety warning device for vehicles which serves both as a "flag" type warning device and as a reflector warning device. It is a further object to provide such a device which is reliable and which is both simple and lightweight in construction. It is still a further object to provide such a device which is also inexpensive and rugged.

BRIEF SUMMARY

The foregoing and other objects which will be apparent to those having ordinary skill in the art are achieved according to the present invention by providing a safety signal device for a vehicle comprising an air shield member, a rotatable reflector member mounted for rotation rearwardly, in the sense of vehicle motion, of the air shield member, the rotating reflector member being partially shielded from air flowing relative to said device due to motion of the vehicle, and mounting means for mounting the reflector in position such that a portion thereof extends into the flowing air for rotation of the reflector in fixed position rearwardly of said shield member, the reflector member being plainly visible when viewed from the rear of the vehicle.

DETAILED DESCRIPTION

There follows a detailed description of an embodiment of the invention including the drawings in which.

Figure 2:
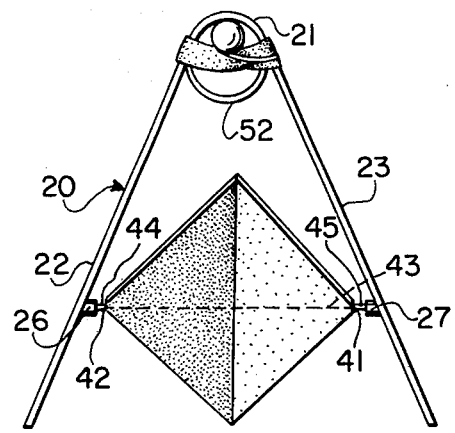
FIG. 2 is a top view of the device of FIG. 1.
Figure 3:
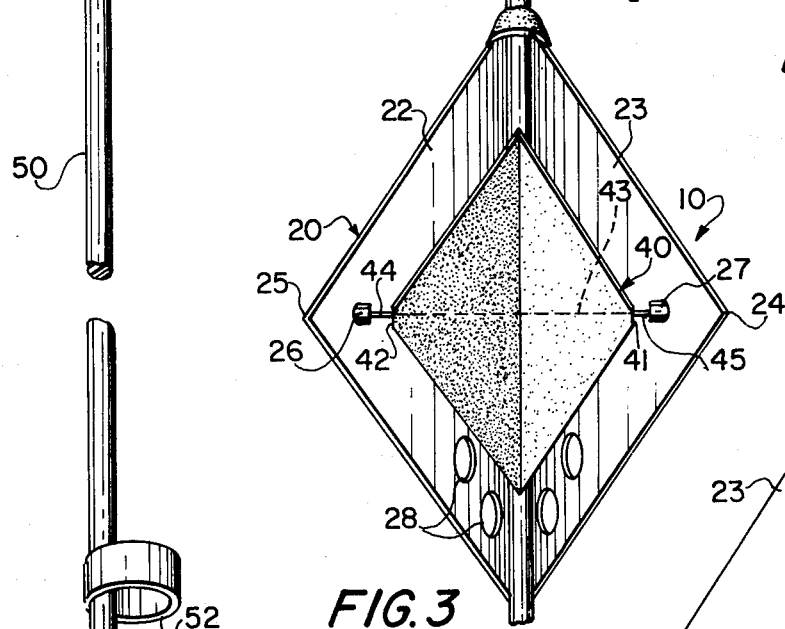
FIG. 3 is a rear view of a portion of the device of FIG. 2.
Figure 4:
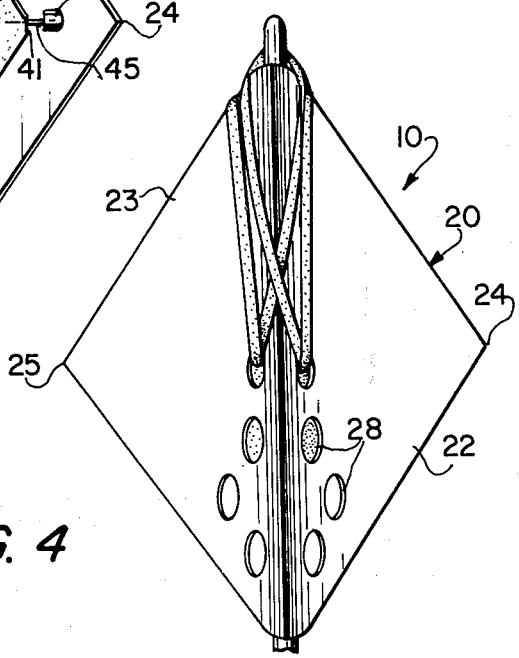
FIG. 4 is a front view of a portion of the device of FIG. 1.

An embodiment of a safety signal device according to the invention is generally designated 10 in the drawings and includes a channel-shaped air shield member 20 and a rotatable reflector member 40. In this embodiment, channel-shaped member 20 is a single piece of plastic shaped into a "V" cross section (see FIG. 2). The bottom 21 of the channel-formed at the apex of the V - is elongate and the member is symmetrical about the bottom. The walls 22, 23 of the channel-shaped member are widest adjacent bottom 21 of the channel-shaped member and taper inwardly to rear end 24, 25 remote from bottom 21.

Reflector member 40 is a planar plastic member, diamond in shape, and is symmetrical about an axis of rotation extending between two opposite points 41, 42 of the diamond. The axis of rotation of the reflector member is indicated by dashed line 43.

Reflector member 40 is rotatably mounted in fixed position relative to member 20 such that at least a portion of the reflector member is located between the walls of channel-shaped member 20 and such that axis of rotation 43 is parallel to a line extending between walls 22, 23 of channel-shaped member 20. In this embodiment, the walls of the channel-shaped member 20 are symmetrical about bottom portion 21 and member 40 is mounted with its axis of rotation 43 extending between points on the channel walls which are symmetrically located with respect to bottom portion 21. Accordingly, when the device is moved through the air the bottom portion 21 of member 20 forward, in leading edge position, member 40 and its axis of rotation 43 assume a position substantially transverse to the flow of air relative to moving member 20. Reflector member 40 is provided with axle members 44 and 45 at points 42 and 41 respectively. In this embodiment, a metal pin extends through member 40 along axis 43 and is fixed to member 40. The ends of the pin extending beyond points 41 and 42 of member 40 constitute axle members 44 and 45. Axle members 44 and 45 are received in bearing members 26 and 27 respectively. In this embodiment members 26 and 27 comprise a short section of cylindrical plastic tubing glued to the inner surface of walls 22 and 23 with the tube opening positioned to receive axle members 44 and 45. The inner ends of the tubing section which are glued to the wall members are preferably cut with a bias so that the bore of the tubing is in alignment with the axis of rotation of member 40.

Figure 5:
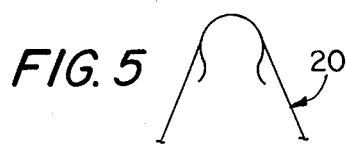
FIGS. 5 and 6 are top views of a portion of the device of FIG. 1 provided with alternative attachment means.
Figure 6:
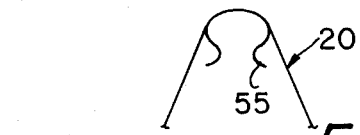
Figure 1:
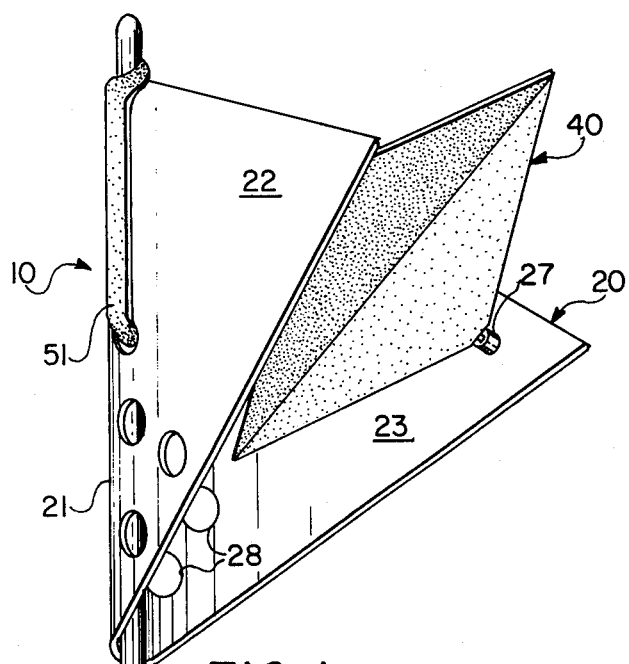
FIG. 1 is a perspective view of a safety signal device for vehicles according to the invention.

Member 20 is secured to elongate support rod 50 in any convenient manner such as by gluing, or by mechanical fastening means such as the rubber band 51 illustrated in FIGS. 1–4 or one or more spring clips 53 (FIG. 5) or clamping projections 56 secured to member 20 and adapted to engage rod 50. Member 50 is conveniently fixed in the bottom 21 of member 20 as shown. Member 50 is provided at its lower end remote from member 20 with one or more conventional ring clamps 52 or other means for securing rod 50 to a vehicle. The invention provides particular utility in bicycles and rod 50 is conveniently secured to the bicycle from by one or more conventional adjustable ring clamps.

When in use, the device is oriented with bottom 21 of member 20 substantially vertical and forward in the sense of the forward motion of the vehicle to which it is attached. Member 20 is thus visible from the front of the vehicle and may serve as a warning signal, visible over hills, etc., that a vehicle is approaching. Conventional safety signal devices of this type includes flags attached to elongate support members and member 20 functions in the same manner when positioned at the end of rod 50 which may be of a type conventionally used to support flag signals.

The rotating reflector member 40 is mounted in position between the walls of channel-shaped member 20 and is thus visible from the rear, in the sense of the motion of the vehicle. At least a portion of the reflector 20 is positioned in the space between the channel walls and the reflector is positioned relative to member 20 such that when member 20 is moved forwardly through the air, member 20 shields a portion of the rotatable reflector from the air flowing relative to the device. The remaining portion of the reflector is contacted by the flowing air to cause rotation of the rotatable member.

In the illustrated embodiment, virtually the entire rotatable member, as viewed from the front (FIG. 4) is shielded from the air flow by member 20. Accordingly, in this embodiment, member 20 is perforated at 28. Air flowing through perforations 28 contacts the portion of rotatable member 20 positioned behind (see FIG. 4) perforations 28. The remaining, upper, portion of member 20 is shielded by member 20 from the moving air and member 20 will be caused to rotate. It will be understood that not all of the air will be prevented from contacting the upper portion of member 20. It will thus be understood that the "shielding" provided by member 20 is relative in that the amount of air contacting the lower portion is greater than that contacting the upper portion and that the differential is sufficient to induce rotation at normal vehicle speeds.

Member 20 is not necessarily perforated and, when it is not, member 40 is positioned such that a portion thereof extends, either above or below shield member 20, into the air flowing past air shield member 20 such that rotation of member 40 is induced at normal vehicle speeds. Where a portion of member 40 extends into the air stream outwardly of air shield member 40, it will be visible from the front of the vehicle. For this reason, it is preferred to use a perforated air shield member which more fully obscures reflection from member 40 when viewed from the front of the vehicle. Accordingly, if member 40 is not fully obscured by air shield member 20, it is preferred to limit the amount of member 40 extended beyond the air shield - as viewed from the front - to the minimum needed to cause rotation.

In the illustrated embodiment, the axis of rotation 43 is horizontal in use. However, air shield member 20 may take other forms in which the axis of rotation may, for example, be vertical. For example, member 20 could simply be fixed to support rod 50 with bottom portion 21 horizontal. Axis of rotation 43 would then be vertical.

Air shield member 20 shown in the drawings is V shaped in cross section, that is, as viewed from the top (FIG. 2) or bottom. It will be readily apparent that the cross section may vary widely. For example, it may be "U" shaped in which case walls 22 and 23 would be curved. Moreover, the walls may vary in cross section as desired.

The air shield member 20 is preferably opaque and may be brightly painted or otherwise provided with a bright or reflective or luminescent front and/or rear surface, such surfaces being well known in the art. In a preferred embodiment, the front surface is bright white and highly reflective.

Reflector 40 can be provided with any conventional reflective material. In a preferred embodiment, the reflector member is a planar element which, when rotated, produces a "flickering" effect due to the fact that surfaces of differing reflective properites are sequentially brought into view. This is conveniently done by providing a reflective material on one surface of member 40 and a less reflective or non-reflective material in the other. Alternatively, a first portion of one surface of member 40 may be reflective and a second portion non-reflective and the corresponding portions of the other surface of member 40 are complementary in reflectivity. Moreover, while member 40 is shown as a planar member, it can take any convenient form such as a paddle wheel, a cylinder, polygon, etc. Where member 40 is a paddle wheel, the paddle elements preferably have different reflectivity characteristics to provide a flickering effect. Where the element is a cylinder, or polygon, portions of the periphery are preferably provided with differing reflective characteristics to provide a flickering effect.

In the preferred embodiment, member 40 is rotatably supported by shield member 20. It will be understood, however, that member 40 can be supported by means of a separate member or members such as a separate yoke-shaped member attached to support rod 50.

1. A safety signal device for a vehicle comprising:
   a rotatable reflector member adapted to be rotated on on axis of rotation by air flow in a direction parallel to the motion of the vehicle,
   a channel-shaped air shield member for deflecting a major portion of the air flow from said rotatable reflector member while permitting a minor portion of said air flow to contact at least a portion of that part of the reflector member which lies on one side of the axis of rotation of said reflector member to cause rotation of said reflector member, the part of said reflector member lying on the other side of said axis of rotation being shielded from said air flow, said air shield member comprising a front portion the front surface of which, in use, faces in the direction of vehicle travel, and first and second side walls which are interconnected by said front portion and extend rearwardly thereof to form a channel therebetween,
   means affixed to the inner surfaces of said side walls for rotatably mounting said reflector in said channel, between said side walls, such that the axis of rotation of said reflector member extends between said side walls and said side walls deflect the major portion of the air which moves past said shield member in the direction of movement of the vehicle, and
   vehicle mounting means for mounting said air shield member on the vehicle.

2. A safety signal device according to claim 1 wherein said air-shield member is symmetrical and wherein the axis of rotation of said rotatable member is transverse to a line parallel to the bottom of said air-shield member.

3. A safety signal device according to claim 1 wherein said mounting means comprise bearing members located on the inner walls of said air-shield member.

4. A safety signal device according to claim 1 wherein said air-shield substantially member is V-shaped in cross section, and wherein the walls thereof are substantially triangular.

5. A safety signal device according to claim 1 wherein said air shield member is U-shaped in cross section.

6. A safety signal device according to claim 1 wherein a portion of at least one of the walls of said air-shield member is perforated, and wherein air flowing through said perforated portion contacts the rotatable reflector to cause rotation thereof.

7. A safety signal device according to claim 1 in which at least a portion of the surface of said air-shield member is highly reflective.

8. A safety signal device according to claim 1 in which the rotatable reflector member comprises a planar member, the first surface of which has two areas of differing reflective properties, the second surface having two corresponding areas of differing reflective properties, each area on the second surface having different reflective properties from a corresponding area on the first surface whereby a flickering effect is caused by rotation of said rotatable reflector member.

9. A safety signal device according to claim 8 wherein said rotatable reflector member is diamond shaped.

10. A safety signal device according to claim 1 wherein said vehicle mounting means comprises an elongate support member and means for securing said air-shield member to said support member along said front portion of said air shield member between said walls thereof.

11. A safety signal device according to claim 1 wherein said elongate member comprises a pole and further includes means remote from said air-shield member for mounting said elongate member on a vehicle.

12. A safety signal device according to claim 1 wherein said reflector member is symmetrical about the axis of rotation thereof.

13. A safety signal device according to claim 12 wherein said air shield member is symmetrical about said bottom thereof and wherein said reflector member is symmetrically mounted to said walls of said air shield member.

* * * * *